United States Patent
Tatematsu et al.

[11] Patent Number: 5,965,263
[45] Date of Patent: Oct. 12, 1999

[54] INSULATED WIRE

[75] Inventors: Yoshinori Tatematsu; Atsushi Higashiura, both of Tokyo; Naruhiko Inayoshi; Hiromitsu Asai, both of Kariya, all of Japan

[73] Assignees: The Furukawa Electric Co., Ltd., Tokyo; Denso Corporation, Aichi-ken, both of Japan

[21] Appl. No.: 08/995,755

[22] Filed: Dec. 22, 1997

[30] Foreign Application Priority Data

Dec. 25, 1996 [JP] Japan ................................. 8-345650

[51] Int. Cl.$^6$ ................................................. B32B 27/00
[52] U.S. Cl. ........................... 428/383; 428/379; 428/375; 174/120 R; 174/110 SR; 174/110 PM
[58] Field of Search ................................. 428/379, 375, 428/383; 528/73, 84; 174/110 N, 120 SR, 110 SR, 110 PM

[56] References Cited

U.S. PATENT DOCUMENTS

| | | | |
|---|---|---|---|
| 3,922,465 | 11/1975 | Kawaguchi et al. | 428/383 |
| 4,129,678 | 12/1978 | Seki et al. | 428/383 |
| 4,505,980 | 3/1985 | Nishizawa et al. | 428/383 |
| 5,606,152 | 2/1997 | Higashiura et al. | 174/120 R |
| 5,750,257 | 5/1998 | Doshita et al. | 428/379 |

*Primary Examiner*—Merrick Dixon
*Attorney, Agent, or Firm*—Birch, Stewart, Kolasch & Birch, LLP

[57] ABSTRACT

There is disclosed an insulated wire, having, on a conductor, an insulating coating including at least three layers, made up of an underlayer formed by applying and baking a polyamine-imide-series resin coating material, containing 0.05 to 1.0 parts by weight of a trialkylamine, and/or 5 to 20 parts by weight of an alkoxylated melamine resin, per 100 parts by weight of a polyamide-imide-series resin, an intermediate layer formed by applying and baking a polyimide-series resin coating material, and an overlayer formed by applying and baking a self-lubricating-type polyamide-imide-series resin coating material. According to the insulated wire, an insulating coating can be prevented from being damaged at the time of the working of a coil under severe conditions, even when the insulating coating is thin.

9 Claims, 3 Drawing Sheets

Direction of movement of electric wire

Fig. 3

Fig. 4

INSULATED WIRE

FIELD OF THE INVENTION

The present invention relates to an insulated wire excellent in abrasion resistance and suitable for coils of motors and generators.

BACKGROUND OF THE INVENTION

Insulated wires which are covered with electrical insulators are used in large quantities for coils integrated in various electrical apparatuses. In recent years, the step of working and winding coils of insulated wires is increased in speed and become rationalized, and the coil winding operation is changing from a manual winding operation to one conducted by automatic coil winding machines. The insertion of coils into stator slots is also automated.

In winding a coil automatically, however, since a great tension is applied to the insulated wire, the stress on the coating film is great and hence the insulated wire is inevitably susceptible to damage. Further, since the insertion of a coil into a stator slot is carried out by machine instead of manual operation, the wire undergoes a greater pressure. Under these circumstances, rubbing between the electric wires, or between the electric wire and an object that comes in contact with the electric wire, easily occurs, and defective insulation of the coil is apt to result.

Further, by making the space factor of the insulated wire in the stator slot where the coil is placed as large as possible, the apparatus can be made small in size and can be lowered in cost. Therefore it is desired to reduce the outer diameter of the electric wire. In recent years, with the reduction in diameter, it is demanded that the diameter of the conductor be kept intact or be increased, in order to increase the power of apparatuses, and therefore it is needed to decrease the build of the insulating coating.

When winding of coils and insertion of coils into stator slots are automated, however, making the insulating coating thin increases the frequency of damage to the coating, resulting in an increase in the rate of the occurrence of defective insulation of the coils.

To solve the above problems, a decrease in the friction coefficient between electric wires, or between an electric wire and an object that comes in contact with an electric wire (e.g. between a metal rod and layer insulating paper), and improvement in the strength of the coating are considered. The lower the friction coefficient is, the easier the winding of a coil is, and the higher the strength of a coating is, the more decreased the damage to a coil is when the coil is wound and the coil is inserted into a stator slot (hereinafter, these operations are referred to as the working of a coil).

As conventionally practiced means of lowering the friction coefficient, there is a method in which a lubricant is applied to the surface of an electric wire, and a method in which a lubricant is added to an electrical insulating coating material and the coating material is applied and baked.

As means of improving the strength of a coating, an insulated wire having a polyamide-imide coating material applied and baked is generally used. Since, in comparison with insulated wires having other resin (e.g. polyester, polyurethane, polyesterimide, polyesteramide-imide, or polyimide) applied and baked, the insulated wire having a polyamide-imide resin coating material applied and baked is high in mechanical strength and excellent in abrasion resistance, it is frequently used when the conditions of the working of a coil are severe.

Recently, however, the conditions of the working of a coil have become increasingly severe, and, in many cases, even when the friction coefficient is decreased as described above or an electric wire having a polyamide-imide resin coating material applied and baked is used, damage to the coating cannot be prevented.

Thus, as a means of preventing the coating from being damaged at the time of the working of a coil, a method for improving the adhesion between an insulating layer and a conductor is suggested. As specific examples of an insulating coating material that achieves this desired adhesion, there are suggested: 1) a heat resistant coating material made from a polyamide-imide resin, an alkoxy-modified amino resin, and benzotriazole (JP-A-3-37283 ("JP-A" means unexamined published Japanese patent application), and 2) a coating material made from a polyamide-imide resin and a trialkylamine (JP-A-6-111632).

In the wires obtained by using these means, although an effect can be observed in the repeated scrape test (a test wherein a relatively small load is applied to the wire and the coating is abraded with a beads-needle), no effect is recognized in the unidirectional scrape test (a test stipulated in JIS C 3003, wherein, while a load is applied increasingly on the wire, the coating is scratched with a piano wire). Recently, the latter test is regarded as important as a coating damage test.

In the case of a wire intended to be improved only in adhesion, as the build of coating is made thin, the repeated abrasion (scraped) value is lowered, in many cases approximately to the same level as that of the conventional wire that is not intended to be improved in adhesion.

On the other hand, a method is suggested in which many rigid structures are introduced in the molecules of a resin, to improve the strength of a coating, to decrease scars made by coil working, and JP-A-6-196025 describes an insulated wire having an insulating coating with the tensile strength and the tensional modulus defined. In such a wire, a remarkable effect is observed in the unidirectional scrape test, and even when the coating is made thin, damage to the coating at the time of the working of a coil can be prevented. However, in comparison with conventional wires, in such a wire, the level of the flexibility after the stretching, and the level of the flexibility after the heat history, are low, and particularly when such a wire is subjected to severe bending, the flexibility is not satisfactory, and therefore there is a risk that the coating may cracked or broken.

As an example of a wire having multiple layers in which different coatings are layered one on the other, to improve the mechanical strength and the heat shock resistance of the final coating, there is a technique described in JP-B-62-21203 ("JP-B" means examined Japanese patent publication). This example discloses an insulated wire that is provided with a polyamide-imide resin as an undermost layer, an aromatic polyimide resin as an intermediate layer, and a polyamide-imide resin as an overlayer, to improve the mechanical properties of the coating and the heat shock resistance after the impregnation treatment with a varnish. In this wire, the repeated abrasion value is found to be improved, and when the wire is heat-treated after the impregnation treatment with a varnish, the varnish pulls the coating, and this force is mitigated in the intermediate layer, to prevent the coating from being broken or cracked. However, although the repeated abrasion value is improved, the wire has no effect on the unidirectional abrasion. Further, when the coating of the wire is made thin, the repeated abrasion value is lowered, and therefore further improvement is required to prevent the coating from being damaged at the time of the working of a coil.

SUMMARY OF THE INVENTION

An object of the present invention is to provide an insulated wire whose insulating coating can be prevented from being damaged at the time of the working of a coil under severe conditions, even when the insulating coating is thin.

The above object and other objects, features, and advantages of the present invention will become apparent more fully from the following description, taken in connection with the accompanying drawings.

DETAILED DESCRIPTION OF THE INVENTION

To attain the above object, the inventors of the present invention have observed fully the states of the damage to insulating coatings of conventional insulated wires, using a microscope, etc., when the insulating coatings are made thin, and they have analyzed the mechanism of the damage. As a result, to solve the above problems, the inventors of the present invention have found that it is needed to attain, simultaneously, three points: the conductor and the insulating coating must be together firmly, the friction coefficient of the wire surface must be lowered, and the structure must be made to disperse the load exerted on the wire within the insulating coating. Further, the inventors of the present invention have found that the above three points can be attained simultaneously by making the insulated coating have a specified multilayer structure, and the present invention has been completed based on this finding.

Specifically, the present invention provides:

(1) An insulated wire, having, on a conductor, an insulating coating comprising at least three layers, made up of an underlayer formed by applying and baking a polyamide-imide-series resin coating material, containing 0.05 to 1.0 part by weight of a trialkylamine, and/or 5 to 20 parts by weight of an alkoxylated melamine resin, per 100 parts by weight of a polyamide-imide-series resin; an intermediate layer formed by applying and baking a polyimide-series resin coating material, and an overlayer formed by applying and baking a self-lubricating-type polyamide-imide-series resin coating material;

(2) The insulated wire as stated in the above (1), wherein each of said polyamide-imide-series resin of said underlayer, and said polyamide-imide-series resin of said overlayer, is synthesized mainly from trimellitic anhydride and an aromatic diamine and/or an aromatic diisocyanate;

(3) The insulated wire as stated in the above (1), wherein each of said polyamide-imide-series resin of said underlayer, and said polyamide-imide-series resin of said overlayer, is synthesized mainly from trimellitic anhydride and 4,4'-diphenylmethane diisocyanate;

(4) The insulated wire as stated in the above (1), wherein said polyimide-series resin of said intermediate layer is synthesized from an aromatic tetracarboxylic acid and an aromatic diamine;

(5) The insulated wire as stated in the above (1), wherein said polyimide-series resin coating material of said intermediate layer is synthesized from pyromellitic dianhydride and 4,4'-diaminodiphenyl ether;

(6) The insulated wire as stated in the above (1), wherein the build of the polyimide-series resin accounts for 10 to 40% of the total build of the insulating coating; and (7) The insulated wire as stated in the above (1), wherein the build of the insulating coating is 20 to 30 $\mu$m.

Hereinbelow, the present invention is described.

The base resin of the polyamide-imide-series resin coating material used for forming the underlayer of the insulating coating in the present invention is not particularly restricted, and use may be made of one obtained by reacting directly a tricarboxylic anhydride with diisocyanates in a polar solvent in a usual manner, or one obtained by reacting, first, a tricarboxylic anhydride with diamines in a polar solvent, to introduce imide bonding, and then carrying out amidation with diisocyanates.

As the tricarboxylic anhydride used for the preparation of this resin, usually trimellitic anhydride is used. In this case, part of the tricarboxylic anhydride may be replaced with a tetracarboxylic anhydride. Here, as the tetracarboxylic anhydride, for example, pyromellitic dianhydride and 3,3', 4,4'-benzophenonetetracarboxylic dianhydride are used. Further, part of the tricarboxylic anhydride may be replaced with other acid or acid anhydride, such as trimellitic acid, isophthalic acid, and terephthalic acid. On the other hand, as the diisocyanates to be reacted with the tricarboxylic anhydride, can be mentioned, for example, aromatic diisocyanates, such as 4,4'-diphenylmethane diisocyanate and tolylene diisocyanate, and as the diamines, can be mentioned aromatic diamines, such as m-phenylenediamine, 4,4'-diaminodiphenyl ether, 4,4'-diaminodiphenylmethane, 4,4'-diaminodiphenyl sulfone, and 4,4'-diaminobenzophenone. Further, for the imidation, N,N'-dimethylformamide can be used. Further, as the polar solvent, N-methyl-2-pyrrolidone can be preferably used.

By adding, to the thus-obtained base resin solution, a trialkylamine and/or an alkoxylated melamine resin, a polyamide-imide-series resin coating material to be used for the underlayer of the insulating coating can be obtained.

As the trialkylamine, preferably a trialkylamine of a lower alkyl, such as trimethylamine, triethylamine, tripropylamine, and tributylamine, can be used. Among these, trimethylamine and triethylamine are most preferable in view of flexibility and adhesion. The proportion of the trialkylamine to the polyamide-imide-series resin is generally 0.05 to 1.0 part by weight, and preferably 0.1 to 1 part by weight, to 100 parts by weight of the polyamide-imide-series resin. If the amount of the trialkylamine to be added is over 1.0 part by weight, the heat resistance of the coating is lowered, whereas if the amount is less than 0.05 parts by weight, it does not contribute to the adhesion.

Further, as the alkoxylated melamine resin used in the present invention, a melamine resin substituted with lower alkoxy groups, such as a butoxylated melamine resin and a methoxylated melamine resin, can be used, and preferably a methoxylated melamine resin is used, in view of the compatibility with the resin. The proportion of the alkoxylated melamine to be added is generally 5 to 20 parts by weight, and preferably 10 to 20 parts by weight, to 100 parts by weight of the polyamide-imide-series resin. If the proportion of the alkoxylated melamine resin to be added is less than 5 parts by weight, a satisfactory adhesion property cannot be obtained, whereas if the proportion is over 20 parts by weight, the heat resistance of the coating is lowered.

The thus-obtained polyamide-imide-series resin coating material is applied to a conductor and is baked, to form an underlayer of an insulating coating on the conductor.

The polyimide-series resin used for the intermediate layer of the insulating coating in the present invention can be obtained by imidating a polyamide acid solution, which is obtained by reacting an aromatic tetracarboxylic dianhydride with aromatic diamines in a polar solvent, by heating at the time of baking. The aromatic tetracarboxylic anhydride is not particularly restricted, and those generally used can be used, such as pyromellitic dianhydride, 3,3',4,4'-biphenyltetracarboxylic dianhydride, and 3,3',4,4'-benzophenonetetracarboxylic dianhydride, and their derivatives. Pyromellitic dianhydride is most preferable, because it is readily available. The aromatic diamines are not particularly restricted, and examples include 4,4'-diaminodiphenyl ether, 4,4'-diaminodiphenyl sulfone, 4,4'-diaminobenzophenone; and 4,4'-diaminodiphenylmethane. 4,4'-diaminodiphenyl ether is preferable, because it is readily available.

The polyamide acid solution is applied on the coating of the underlayer and is baked, to form an intermediate layer made of a polyimide resin coating.

In the present invention, when a heavy load is applied to the insulated wire, the intermediate layer serves to not transmit the stress directly to the underlayer of the insulating coating.

The base resin of the polyamide-imide-series resin coating material forming the overlayer of the insulating coating in the present invention can be prepared in the same manner as the base resin of the polyamide-imide-series resin coating material for forming the undermost layer. Into that base resin, a wax or a lubricant is dispersed and mixed in a usual manner, to form a self-lubricating-type polyamide-imide-series resin coating material for the overlayer. As the wax to be dispersed and mixed, a usually used wax can be used without any restrictions, and examples include a synthetic wax, such as a polyethylene wax, a petroleum wax, and a paraffin wax, and a natural wax, such as carnauba wax, candelilla wax, and rice wax. The lubricant is also not particularly restricted, and, for example, a silicone, a silicone macromonomer, and a fluororesin can be used.

Such a self-lubricating-type polyamide-imide resin coating material is applied onto the intermediate layer and is baked, to provide an overlayer of a self-lubricating-type polyamide-imide.

Parenthetically, for the insulated wire of the present invention, the conditions and the methods of the application and baking of the resin coating materials for forming the respective layers of the insulating coating are not particularly restricted, and known various techniques can be used. The conductor is also not particularly restricted.

Because the insulated wire of the present invention has an insulating coating having the above multilayer structure, the following are simultaneously realized:

1) the stress applied from outside is dispersed among each of the layers of the insulating coating;

2) the adhesion between the conductor and the underlayer of the insulating coating in direct contact with the conductor is made firm; and 3) the friction coefficient of the surface of the insulated wire is made low.

As a result, even when the insulating coating is made as thin as 30 $\mu$m or less, the insulated wire has a abrasion resistance high enough to withstand the working of a coil under severe conditions. In consideration of both the abrasion resistance and the layer-thinning, the total build of the insulating coating of the insulated wire of the present invention is preferably 20 to 30 $\mu$m.

In the present invention, preferably the proportion of the build of the intermediate layer to the total build of the insulating coating is from 10 to 40%. The effect of making the intermediate layer have this build is that the abrasion resistance of the insulating coating is improved effectively. If the proportion of the build of the intermediate layer is over 40%, the electrical properties after damaged by the working are adversely affected, in some cases. The build of the underlayer and the overlayer is not particularly restricted.

Since the insulated wire of the present invention is high in abrasion resistance, even if a heavy load is applied to the insulated wire under severe conditions of the working of a coil, a scar hardly reaches the conductor, and the insulated wire hardly invites insulation failure. Further, in the insulated wire of the present invention, even though the insulating coating is made thin, high abrasion resistance is maintained. Therefore, a highly reliable coil can be provided with the slot fill (space factor) of the insulated wire reduced, and thus the insulated wire of the present invention can exhibit an excellent effect that apparatuses wherein coils are used can be made small-sized, can be reduced in cost, and can be improved in reliability.

Hereinbelow, the present invention is described in more detail based on Examples.

EXAMPLES

In passing, compositions (in parts by weight) of the underlayers of the insulating layers of the insulated wires of Examples and Comparative Examples are summarized in Tables 1 and 2.

Example 1

A stirrer, a condenser, and a calcium chloride-filled tube were attached to a 2-liter, four-necked flask, 192 g of trimellitic anhydride, 250 g of 4,4'-diphenylmethane diisocyanate, and 663 g of N-methyl-2-pyrrolidone were charged therein, the temperature was elevated to 80° C. over 2 hours, and then they were reacted at 140° C. for 5 hours. Thereafter the reaction mixture was cooled to 50° C., and 163 g of N,N'-dimethylformamide was added, to dilute it. Further, 1.8 g of trimethylamine and 35.4 g of a methoxylated melamine resin (trade name, Cymel 300, manufactured by Mitsui Cyanamid Co.) were added, followed by stirring for 1 hour, to obtain a polyamide-imide-series resin coating material for an underlayer of an insulating coating.

A stirrer, a condenser, and a calcium chloride-filled tube were attached to a 3-liter, four-necked flask, 218 g of pyromellitic anhydride, 200 g of 4,4'-diaminodiphenyl ether, and 1,672 g of N-methyl-2-pyrrolidone were charged therein, and they were reacted for 5 hours with the temperature kept at 30° C. or below, to obtain a polyimide-series resin coating material for an intermediate layer.

To a commercially available polyamide-imide-series resin coating material (trade name, H1406, manufactured by Hitachi Chemical Co., Ltd.), was added a polyethylene wax (trade name, Sanwax 131P, manufactured by Sanyo Chemical Industries, Ltd.), in an amount of 1% by weight based on the resin solid, to obtain a self-lubricating-type polyamide-imide-series resin coating material for an overlayer.

The above coating material for an underlayer was applied to a copper wire having a diameter of 1.0 mm, followed by baking in an 8 m-length baking oven, and this procedure was repeated plural pass, to form an underlayer having a build (thickness) of 19 μm of an insulating coating. The above coating material for an intermediate layer was applied thereon and baked one pass, to form an intermediate layer having a build of 3 μm. Then, the above coating material for an overlayer was applied thereon and baked one time, to form an overlayer having a build of 3 μm, thereby obtaining an insulated wire having a total build of the insulating coating of 25 μm.

Figure 1:
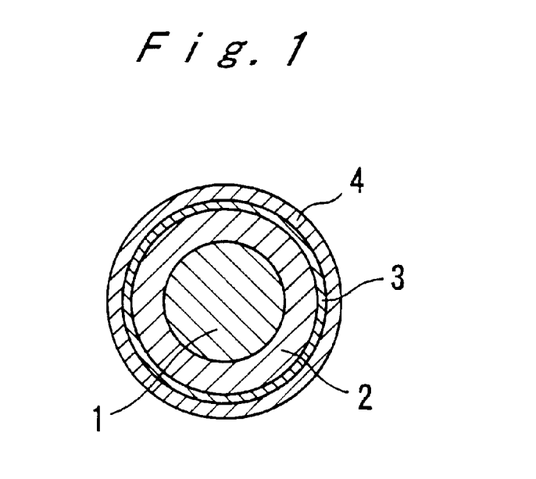
FIG. 1 is a cross-sectional view showing an embodiment of the insulated wire of the present invention.

FIG. 1 shows a cross-sectional view of an embodiment of the insulated wire of the present invention thus produced. In FIG. 1, reference numeral 1 indicates the conductor (copper wire), and thereon are formed the underlayer 2 of the insulating coating, the intermediate layer 3 of the insulating coating, and the overlayer 4 of the insulating coating, which have the above respective builds by using the above each coating materials.

Example 2

An insulated wire was prepared in the same manner as in Example 1, except that the amount of trimethylamine used in the coating material for the underlayer of the insulating coating was changed to 3.6 g, thereby obtaining the insulated wire having a total build of the insulating coating of 25 μm, with the underlayer build being 19 μm, the intermediate layer build being 3 μm, and the overlayer build being 3 μm.

Example 3

An insulated wire was prepared in the same manner as in Example 1, except that, instead of the trimethylamine used in the coating material for the underlayer of the insulating coating, triethylamine, in an amount of 3.6 g, was added, and instead of the methylated melamine resin, butoxylated melamine resin, in an amount of 35.4 g, was added, thereby obtaining the insulated wire having a total build of the insulating coating of 25 μm, with the underlayer build being 19 μm, the intermediate layer build being 3 μm, and the overlayer build being 3 μm.

Example 4

An insulated wire was prepared in the same manner as in Example 3, except that the amount of triethylamine used in the coating material for the underlayer of the insulating coating was changed to 1.8 g, and the amount of buthoxylated melamine resin was changed to 35.4 g, thereby obtaining the insulated wire having a total build of the insulating coating of 25 μm, with the underlayer build being 19 μm, the intermediate layer build being 3 μm, and the overlayer build being 3 μm.

Example 5

An insulated wire was prepared in the same manner as in Example 1, except that the build of the underlayer of the insulating coating was 16 μm, and the build of the intermediate layer was 6 μm, thereby obtaining the insulated wire having a total build of the insulating coating of 25 μm.

Example 6

An insulated wire was prepared in the same manner as in Example 1, except that the build of the underlayer of the insulating coating was 14 μm, thereby obtaining the insulated wire having a total build of the insulating coating of 20 μm.

Example 7

An insulated wire was prepared in the same manner as in Example 3, except that the build of the underlayer of the insulating coating was 14 μm, thereby obtaining the insulated wire having a total build of the insulating coating of 20 μm.

Example 8

An insulated wire was prepared in the same manner as in Example 1, except that the methoxylated melamine resin was excluded from the coating material for the underlayer of the insulating coating, thereby obtaining the insulated wire having a total build of the insulating coating of 25 μm, with the underlayer build being 19 μm, the intermediate layer build being 3 μm, and the overlayer build being 3 μm.

Example 9

An insulated wire was prepared in the same manner as in Example 1, except that the trimethylamine was excluded from the coating material for the underlayer of the insulating coating, thereby obtaining the insulated wire having a total build of the insulating coating of 25 μm, with the underlayer build being 19 μm, the intermediate layer build being 3 μm, and the overlayer build being 3 μm.

Example 10

A stirrer, a condenser, and a calcium chloride-filled tube were attached to a 2-liter, four-necked flask, 192 g (1.0 mol) of trimellitic anhydride, 99 g (0.5 mol) of 4,4'-diaminodiphenylmethane, and 436.5 g of N-methyl-2-pyrrolidone were charged thereinto, the temperature of the contents was elevated to 200° C., and they were reacted for 2 hours. Water generated during the reaction was suitably removed from the system to the outside. Thereafter the temperature was lowered to 80° C.; then 125 g (0.5 mol) of 4,4'-diphenylmethane diisocyanate was added, the temperature was elevated to 140° C., and they were reacted for 5 hours. Thereafter the reaction mixture was cooled to 50° C., and 140 g of N-methyl-2-pyrrolidone was added, to obtain a polyamide-imide resin coating material, having a nonvolatile content of 30%. Then, 1.24 g of trimethylamine and 24.7 g of a methoxylated melamine resin were added to this resin coating material, to obtain a polyamide-imide-series resin coating material for an underlayer of an insulating layer.

The above coating was applied to a copper wire having a diameter of 1.0 mm, followed by baking in an 8 m-length baking oven, and this procedure was repeated plural pass, to form an underlayer having a build of 19 μm of an insulating coating. The polyimide resin-series coating material described in Example 1 was applied thereon and was baked one pass, to form an intermediate layer having a build of 3 μm. Further, the self-lubricating-type polyamide-imide-series resin coating material for an overlayer described in Example 1 was applied thereon and baked one pass, to form an overlayer having a build of 3 μm, thereby obtaining an insulated wire having a total build of the insulating coating of 25 μm.

Comparative Example 1

A commercially available polyamide-imide resin coating material (trade name, H1406, manufactured by Hitachi Chemical Co., Ltd.) was applied on a copper wire having a diameter of 1.0 mm and was baked in an 8 mm-length, vertical-type baking oven, and this procedure was repeated plural pass, to obtain an insulated wire having a film build of the insulating coating of 35 m.

Comparative Example 2

An insulated wire was prepared in the same manner as in Comparative Example 1, except that the film build of the insulating coating was 25 μm, thereby obtaining the insulated wire.

Comparative Example 3

The coating material for an underlayer of an insulating coating used in Example 1 was applied on a 1.0 mm-diameter copper wire and was baked in an 8 mm-length vertical-type baking oven, and this procedure was repeated plural pass, to obtain an insulated wire having a film build of the insulating coating of 35 μm.

Comparative Example 4

An insulated wire was prepared in the same manner as in Comparative Example 3, except that the film build of the insulating coating was 25 μm, thereby obtaining the insulated wire.

Comparative Example 5

The commercially available polyamide-imide resin coating material used in Comparative Example 1 was applied on a 1.0 mm-diameter copper wire and was baked in an 8 m-length vertical-type baking oven, and this procedure was repeated plural pass, to form an underlayer having a build of 20 μm. The coating material for an intermediate layer used in Example 1 was applied thereon and baked, and this procedure was repeated plural pass, to form an intermediate layer having a build of 10 μm. Further, the above commercially available polyamide-imide resin coating material was applied thereon and baked, to form an overlayer having a build of 5 μm, thereby obtaining an insulated wire having a total build of the insulating coating of 35 μm.

Comparative Example 6

An insulated wire was prepared in the same manner as in Comparative Example 5, except that the build of the underlayer of the insulating coating was 10 μm, thereby obtaining the insulated wire having a total build of the coating of 25 μm.

Comparative Example 7

The coating material for an underlayer of an insulating coating used in Example 1 was applied on a 1.0 mm-diameter copper wire and was baked in an 8 m-length vertical-type baking oven, and this procedure was repeated plural pass, to form an underlayer having a build of 22 μm. Further, the coating material for an overlayer used in Example 1 was applied thereon and baked one pass, to form an overlayer having a build of 3 μm, thereby obtaining an insulated wire having a total build of the insulating coating of 25 μm.

Comparative Example 8

An insulated wire was prepared in the same manner as in Example 1, except that the amounts of trimethylamine and methoxylated melamine resin added in the coating for an underlayer of an insulating coating were changed to 0.11 g and 10.6 g, thereby obtaining the insulated wire having a total build of the insulating coating of 25 μm, with the underlayer build being 19 μm, the intermediate layer build being 3 μm, and the overlayer build being 3 μm.

The abrasion resistance of the various insulated wires obtained in the above Examples and Comparative Examples was evaluated by using the following test methods:

(1) Unidirectional scrape test

The unidirectional scrape test was carried out in accordance with JIS C 3003.

(2) Repeated scrape test

The repeated scrape test was carried out in accordance with old-version JIS C 3003 (1974).

(3) Measurement of load that causes damage to coating by using piano wire

Figure 2:
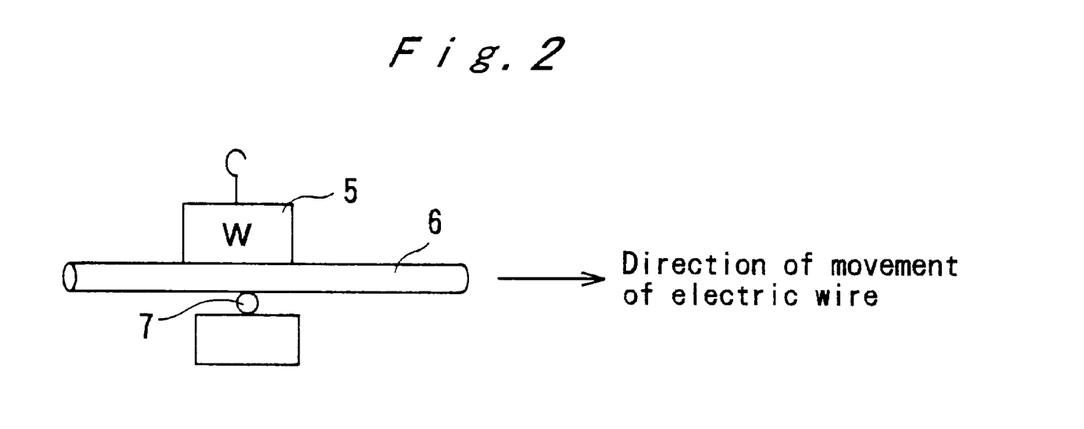
FIG. 2 is a schematic view of a test apparatus for the load measuring method for measuring damage to a coating by using a piano wire.

As is shown in the schematic view of FIG. 2, the insulated wire 6 and a piano wire 7 were placed orthogonally, a certain load 5 was applied to the piano wire, and the insulated wire was pulled out. Thereafter the state of the coating was observed, and the load that caused the conductor to be exposed was measured.

(4) Measurement of coil leakage current value

After the coil was inserted into a stator slot by using an insert winder machine and was immersed, together with a counter electrode, in a brine having a concentration of 5% by weight, a direct voltage of 12 V was applied, with the coil being a plus electrode, and the value of leak current was measured.

(5) Adhesion test (sleeve test) between copper wire and coating (in accordance with JIS C 3003)

After the test piece was applied to a tensile machine, the broken part was observed under a microscope, and the length of the coating that was separated (thrusted up) from the conductor was measured.

(6) Coefficient of static friction

Figure 3:
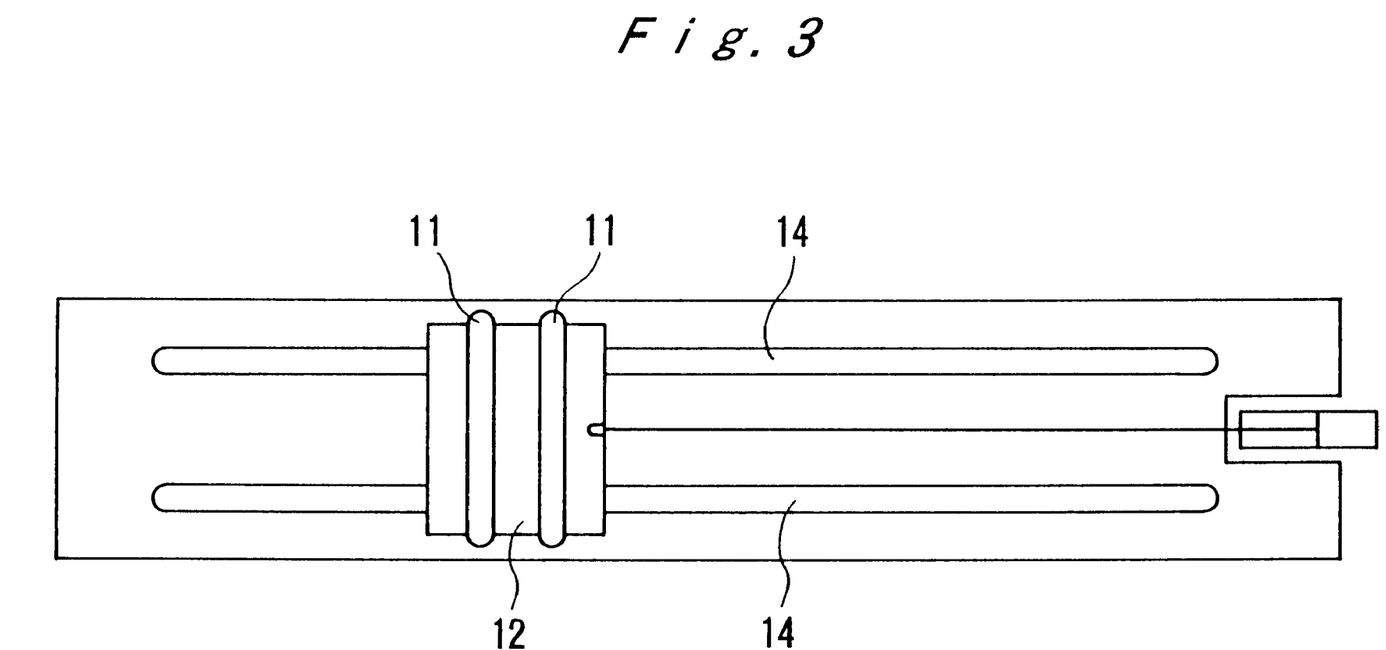
FIG. 3 is a plane view of a measuring apparatus of a coefficient of static friction.
Figure 4:
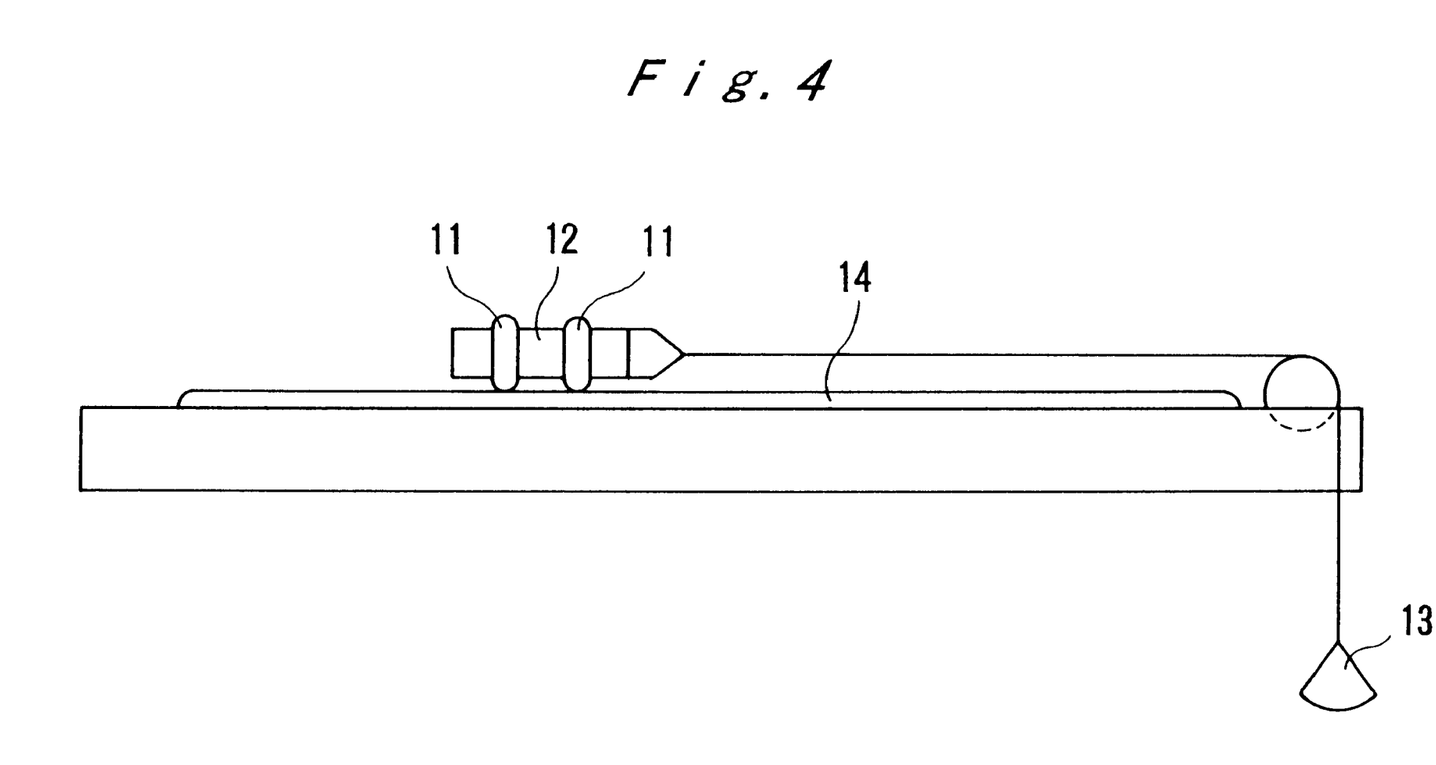
FIG. 4 is a side view of the measuring apparatus of a coefficient of static friction.

The static friction was measured by the apparatus whose plane view shown in FIG. 3 and whose side view is shown in FIG. 4. That is, the coefficient of static friction between the insulated wires 11 wound around a slider 12 and the insulated wires 14 fixed on a table, was calculated from a load 13 on the slider.

(7) Flexibility after 20% extension

After the insulated wire was extended 20%, the insulated wire was wound around a mandrel having a diameter corresponding to the diameter of the conductor of the wire, and it was observed whether there were any cracks.

The results of the evaluation made by the above test methods are shown in Tables 1 and 2.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| Insulating coating | | | | | | | | | | |
| Composition of under layer (pts. wt.) | | | | | | | | | | |
| Polyamide-imide | 100 | 100 | 100 | 100 | 100 | 100 | 100 | 100 | 100 | 100 |
| Trimethylamine | 0.5 | 1 | | | 0.5 | 0.5 | | 0.5 | | 0.35 |
| Triethylamine | | | 1 | 0.5 | | | 1 | | | |
| Methoxylated melamine | 10 | 10 | | | 10 | 10 | | | 10 | 7.0 |
| Buthoxylated melamine | | | 20 | 10 | | | 20 | | | |
| Under layer build ($\mu$m) | 19 | 19 | 19 | 19 | 16 | 14 | 14 | 19 | 19 | 19 |
| Intermediate layer build ($\mu$m) | 3 | 3 | 3 | 3 | 6 | 3 | 3 | 3 | 3 | 3 |
| Over layer build ($\mu$m) | 3 | 3 | 3 | 3 | 3 | 3 | 3 | 3 | 3 | 3 |
| Test results | | | | | | | | | | |
| Unidirectional scrape (g) | 2500 | 2700 | 2700 | 2300 | 2800 | 2300 | 2200 | 2300 | 2300 | 2300 |
| Repeated scrape (times) | 200 | 220 | 200 | 200 | 170 | 160 | 160 | 200 | 200 | 190 |
| Load that caused damage to coating by piano wire (kg) | 9 | 9.5 | 9 | 8.5 | 10 | 8 | 8 | 8 | 8 | 9.0 |
| Coil leakage current value (mA) | 5 | 4 | 5.5 | 6 | 3 | 6 | 6.5 | 6 | 8 | 5.5 |
| Coefficient of static friction | 0.05 | 0.05 | 0.05 | 0.05 | 0.05 | 0.05 | 0.05 | 0.05 | 0.05 | 0.05 |
| Adhesion: length of separated coating (mm) | 5 | 3 | 7 | 7 | 5 | 5 | 7 | 7 | 7 | 6 |
| Flexibility after 20% extension*[2] | 1 × D good | 1 × D good | 1 × D good | 1 × D good | 1 × D good | 1 × D good | 1 × D good | 1 × D good | 1 × D good | 1 × D good |

TABLE 2

| | Comparative Example No. | | | | | | | |
|---|---|---|---|---|---|---|---|---|
| | 1 | 2 | 3 | 4 | 5 | 6 | 7 | 8 |
| Insulating coating | | | | | | | | |
| Composition of under layer (pts. wt.) | | | | | | | | |
| Polyamide-imide | 100*[1] | 100*[1] | 100 | 100 | 100*[1] | 100*[1] | 100 | 100 |
| Trimethylamine | | | 0.5 | 0.5 | | | 0.5 | 0.03 |
| Triethylamine | | | | | | | | |
| Methoxylated melamine | | | 10 | 10 | | | 10 | 3 |
| Buthoxylated melamine | | | | | | | | |
| Under layer build ($\mu$m) | 35 | 25 | 35 | 25 | 20 | 10 | 22 | 19 |
| Intermediate layer build ($\mu$m) | — | — | — | — | 10 | 10 | — | 3 |
| Over layer build ($\mu$m) | — | — | — | — | 5 | 5 | 3 | 3 |
| Test results | | | | | | | | |
| Unidirectional scrape (g) | 2000 | 1600 | 2000 | 1600 | 1800 | 1500 | 1600 | 1600 |
| Repeated scrape (times) | 250 | 150 | 270 | 150 | 200 | 120 | 170 | 150 |
| Load that caused damage to coating by piano wire (kg) | 5 | 4 | 6 | 4 | 5 | 4 | 6 | 5 |
| Coil leakage current value (mA) | 10 | 12 | 9 | 12 | 10 | 13 | 10 | 10 |
| Coefficient of static friction | 0.1 | 0.1 | 0.1 | 0.1 | 0.1 | 0.1 | 0.05 | 0.05 |
| Adhesion: length of separated coating (mm) | 20 | 20 | 5 | 5 | 20 | 20 | 5 | 20 |
| Flexibility after 20% extension*[2] | 1 × D good | 1 × D good | 1 × D good | 1 × D good | 1 × D good | 1 × D good | 1 × D good | 1 × D good |

(Note)
*[1]Commercially available polyamide-imide resin coating material (trade name: H1406, manufacture by Hitachi Chemical Co. Ltd.,)
*[2]1 × D means one-fold the diameter.

The improvement in the abrasion resistance of the insulated wires of the Examples was confirmed by the unidirectional scrape test stipulated in JIS C 3003. In this test, while the load was progressively increased, the coating was scraped with a piano wire, and a phenomenon was observed that, in the insulated wires in the Examples, only the intermediate layer and the overlayer of the insulating coating were scraped off under heavy loads (2,000 to 3,000 g), and the underlayer remained. This phenomenon was not observed in the Comparative Examples and was a novel unique phenomena.

This phenomenon may be considered in the following way: In the insulated wires of the Examples of the present invention, even when a progressively increasing load was applied to allow a considerable force to be exerted on the coating, the different layered coatings dispersed this force, and the strong adherence between the undermost layer and the conductor did not allow the applied force to scrape all the insulating coating, including the undermost layer, and did not allow the conductor to be scared.

In contrast, in the case of the wires of Comparative Examples 1 and 2, since there was no polyimide resin layer corresponding to the intermediate layer of the present invention, when a heavy load was applied, the force could not be dispersed but caused the conductor to be scared, and therefore an intended abrasion resistance could not be obtained.

In the case of the wires of Comparative Examples 3 and 4, although use was made of the same polyamide-imide coating material wherein trimethylamine and a methoxylated melamine resin were added used in Example 1, since the insulating coating was not a multilayer coating, an applied force could not be dispersed but caused the conductor to be scared, and therefore an intended abrasion resistance could not be obtained.

In the case of the wires of Comparative Examples 5 and 6, although the applied force was dispersed due to the intermediate layer, that is the polyimide resin layer, since the adhesion between the insulating coating and the conductor was lower in comparison with that of Examples, a satisfactory abrasion resistance could not be obtained.

The insulating coating of the wire of Comparative Example 7 had a two-layer structure having no intermediate layer, but the abrasion resistance was not satisfactory in comparison with Example 1.

The insulating coating of the wire of Comparative Example 8 had the same three-layer structure as that of Examples, but the added amounts of the trialkylamine and the alkoxylated melamine resin in the coating material for an underlayer were small, so that a satisfactory abrasion resistance could not be obtained.

Thus, it can be seen that, since the insulated wire of the present invention has an insulating coating having a multilayer structure, with an underlayer adhered strongly to the conductor, an intermediate layer that mitigates an applied stress, and an overlayer low in friction coefficient, an abrasion resistance not conventionally secured is obtained.

Having described our invention as related to the present embodiments, it is our intention that the invention not be limited by any of the details of the description, unless otherwise specified, but rather be construed broadly within its spirit and scope as set out in the accompanying claims.

What we claim is:

1. An insulated wire, having, on a conductor, an insulating coating comprising at least three layers, made up of
   an underlayer formed by applying and baking a polyamide-imide-series resin coating material, containing 0.05 to 1.0 parts by weight of a trialkylamine, and/or 5 to 20 parts by weight of an alkoxylated melamine resin, per 100 parts by weight of said polyamide-imide-series resin contained in said underlayer;
   an intermediate layer formed by applying and baking a polyimide-series resin coating material; and
   an overlayer formed by applying and baking a self-lubricating type polyamide-imide-series resin coating material, wherein the film build of the insulating coating is 20 to 30 $\mu$m.

2. The insulated wire according to claim 1, wherein each of said polyamide-imide-series resin of said underlayer, and said polyamide-imide-series resin of said overlayer, is synthesized mainly from trimellitic anhydride and an aromatic diamine and/or an aromatic diisocyanate.

3. The insulated wire according to claim 1, wherein each of said polyamide-imide-series resin of said underlayer, and said polyamide-imide-series resin of said overlayer, is synthesized mainly from trimellitic anhydride and 4,4'-diphenylmethane diisocyanate.

4. The insulated wire according to claim 1, wherein said polyimide-series resin coating material of said intermediate layer is synthesized from an aromatic tetracarboxylic acid and an aromatic diamine.

5. The insulated wire according to claim 1, wherein said polyimide-series resin coating material of said intermediate layer is synthesized from pyromellitic anhydride and 4,4'-diaminodiphenyl ether.

6. The insulated wire according to claim 1, wherein the film build of the polyimide-series resin accounts for 10 to 40% of the overall film build of the insulating coating.

7. The insulated wire according to claim 1, wherein said underlayer contains 0.1 to 1 part by weight of said trialkylamine to 100 parts by weight of said polyamide-imide-series resin of said underlayer.

8. The insulated wire according to claim 1, wherein said underlayer contains 10 to 20 parts by weight of said alkoxylated melamine resin to 100 parts by weight of said polyamide-imide-series resin of said underlayer.

9. The insulated wire according to claim 1, wherein said underlayer contains 0.1 to 1 part by weight of said alkylamine and 10 to 20 parts by weight of said alkoxylated melamine resin to 100 parts by weight of said polyamide-imide-series resin of said underlayer.

* * * * *